(12) United States Patent
Qu et al.

(10) Patent No.: US 10,761,236 B2
(45) Date of Patent: Sep. 1, 2020

(54) SELF-PROPELLED CONTAINER AND/OR VEHICLE INSPECTION DEVICE

(71) Applicant: Beijing Hualixing Technology Development Co., Ltd., Beijing (CN)

(72) Inventors: Haibo Qu, Beijing (CN); Jie Zhao, Beijing (CN)

(73) Assignee: Beijing Haulixing Technology Development Co., Ltd., Beijing (CN)

( * ) Notice: Subject to any disclaimer, the term of this patent is extended or adjusted under 35 U.S.C. 154(b) by 0 days.

(21) Appl. No.: 16/329,128

(22) PCT Filed: Aug. 30, 2017

(86) PCT No.: PCT/CN2017/099693
§ 371 (c)(1),
(2) Date: Apr. 24, 2019

(87) PCT Pub. No.: WO2018/041143
PCT Pub. Date: Mar. 8, 2018

(65) Prior Publication Data
US 2019/0250302 A1     Aug. 15, 2019

(30) Foreign Application Priority Data

Aug. 30, 2016    (CN) ...................... 2016 2 1015520 U (51) Int. Cl.
*G01V 5/00*    (2006.01)
*G01N 23/04*    (2018.01)

(52) U.S. Cl.
CPC ........... *G01V 5/0016* (2013.01); *G01N 23/04* (2013.01); *G01V 5/00* (2013.01); *G01N 2223/03* (2013.01)

(58) Field of Classification Search
CPC ...... G01N 2223/03; G01N 23/04; G01V 5/00; G01V 5/0008; G01V 5/0016
See application file for complete search history.

(56) References Cited

U.S. PATENT DOCUMENTS 5,638,420 A * 6/1997 Armistead ............ B66C 19/007
378/146
RE39,396 E * 11/2006 Swift ................... G01V 5/0016
378/57

(Continued)

FOREIGN PATENT DOCUMENTS

CN    201077958    6/2008
CN    103529060    1/2014
(Continued)

OTHER PUBLICATIONS

International Search Report for Application No. PCT/CN2017/099693 dated Nov. 10, 2017.
(Continued)

*Primary Examiner* — David P Porta
*Assistant Examiner* — Fani Boosalis
(74) *Attorney, Agent, or Firm* — Tumey L.L.P.

(57) ABSTRACT

Disclosed is a self-propelled container and/or vehicle inspection device, comprising: a rack, a power supply apparatus, a radiation source, a detector cabin, at least two driving motors, and a controller. A fixed beam, a first vertical beam, a transverse beam and a second vertical beam of the rack are fixed to one another; the bottom of the second vertical beam is rotatably mounted with a swing beam forming a balancing suspension. Where a road surface below the device is uneven, the swing beam correspondingly rotates relative to the second vertical beam so as to keep two wheels on the swing beam in close contact with the ground all the time. In the device, a cab of the inspection device is dispensed with, thus staff is not required to drive within the cab and any anxiety of the staff can be eliminated.

20 Claims, 6 Drawing Sheets

(56) References Cited

U.S. PATENT DOCUMENTS

| | | |
|---|---|---|
| 7,991,113 B2 | 8/2011 | Carver |
| 2012/0199753 A1 | 8/2012 | Chuang |

FOREIGN PATENT DOCUMENTS

| | | |
|---|---|---|
| CN | 106324693 | 1/2017 |
| CN | 206074828 | 4/2017 |
| DE | 202009015830 | 4/2010 |
| JP | 4274981 | 6/2009 |
| WO | 2009/141615 | 11/2009 |

OTHER PUBLICATIONS

European Extended Search Report for Application No. 17845445.0 dated Mar. 23, 2020.

* cited by examiner

SELF-PROPELLED CONTAINER AND/OR VEHICLE INSPECTION DEVICE

CROSS REFERENCE

The present application is a continuing application of International Application No. PCT/CN2017/099693, filed on Aug. 30, 2017, which is based upon and claims priority to Chinese Patent Application No. 201621015520.0, filed on Aug. 30, 2016, and the entire contents thereof are incorporated herein by reference.

TECHNICAL FIELD

The present disclosure relates to the field of ray scanning inspection equipment, and more specifically to a self-propelled container and/or vehicle inspection device.

BACKGROUND

At present, a mobile container and/or vehicle inspection device is generally provided with a cab where the staffs drive the inspection device to move. However, staffs generally fear that they will be injured by radiation thusly being disgusted with driving inspection device due to the cab too close to the radiation source. Moreover, the existing mobile container and/or vehicle inspection device is generally provided with four wheels for traveling. Three points can determine a plane, thus, the design of the four wheels has the problem of over-positioning. If the road surface is slightly uneven, one wheel will be warped, which will lead to serious uneven stress on the rack of the device. Because of the heavy weight of the device, the above situation easily causes the rack to be twisted and distorted, which will affect the relative position of the detector and the radiation source thusly resulting in poor scanning and imaging effect of the device.

SUMMARY

The present disclosure aims at solving at least one of the technical problems existing in the prior art.

For this, the purpose of the present disclosure is to providing a self-propelled container and/or vehicle inspection device.

In order to achieve above purpose, embodiments of the present disclosure provide a self-propelled container and/or vehicle inspection device includes a rack, including a gantry, a fixed beam and a swing beam, wherein the gantry includes a transverse beam and a first vertical beam and a second vertical beam arranged at left and right ends of the transverse beam, the fixed beam is arranged in a front-rear direction and is fixedly connected to the first vertical beam, and a first wheel and a second wheel are respectively mounted at front and rear ends of the fixed beam, the swing beam is arranged in the front-rear direction and is rotatably connected to the second vertical beam, such that the swing beam could rotate in a vertical direction relative to the second vertical beam, and a third wheel and a fourth wheel are respectively mounted at front and rear ends of the swing beam; a power supply apparatus, mounted on the rack; a radiation source, mounted on the first vertical beam and connected to the power supply apparatus, and used for generating a ray beam; a detector cabin, comprising a horizontal detector cabin mounted on the transverse beam and a vertical detector cabin mounted on the second vertical beam, wherein a detector array mounted in the horizontal detector cabin and the vertical detector cabin, each of detectors is respectively connected to the power supply apparatus, each of the detectors is respectively aligned with a center of the ray beam; at least two driving motors, respectively connected to the power supply apparatus, wherein each of the driving motors is connected to one wheel, and wheels connected to each of the driving motors are different, the driving motors used to drive the wheels around and axes to rotate; and a controller, connected to the power supply apparatus, the radiation source, each of the detectors and each of the driving motors.

The self-propelled container and/or vehicle inspection device provided by the present solutions includes a rack, a power supply apparatus, a radiation source, a detector cabin, at least two driving motors, and a controller. The power supply apparatus is used for supplying power to each electrical device. The detector cabin comprises the horizontal detector cabin and the vertical detector cabin, wherein the detector array mounted in two detector cabins, each of the detectors is respectively aligned with a center of the ray beam, and the detector array is used for receiving the ray beam and converting it into radiation scanning images. The fixed beam, the first vertical beam, the transverse beam and the second vertical beam of the rack are fixed, and each of the front and rear ends of the fixed beam is mounted with one wheel. Two wheels are always close to ground. The swing beam is rotatably mounted at the bottom of the second vertical beam to form a balanced suspension. Each of the front and rear ends of the swing beam is mounted with one wheel. When a road surface under device is not flat, the swing beam will rotate corresponding with relative to the second vertical beam, so that two wheels on the swing beam are always close to the ground, and the rack is evenly stressed to prevent the rack from being twisted and deformed, thereby ensuring relative positions of the first vertical beam, the transverse beam and the second vertical beam are unchanged, and ensuring the accuracy of the relative positions of the detectors and the radiation source, and ensuring effect of the scanning image of the self-propelled container and/or vehicle inspection device.

The present solution removes the cab of the inspection device, the controller connects and controls the driving motors of the wheels for operation of the driving motors according to a set program so as to drive the wheels to rotate, thusly controlling the self-propelling of the inspection device. Consequently, staffs are not required to drive within the cab, thusly eliminating any anxiety of the staff.

In above technical solutions, preferably, the first vertical beam is detachably hinged to the transverse beam by a first hinge shaft; the second vertical beam is detachably hinged to the transverse beam by a second hinge shaft.

At present, due to the large size of the gantry, the transverse beam and two vertical beams are usually transported in a disassembled state and then assembled at a scanning operation site. During assembly, the two vertical beams need to be lifted in a vertical beams vertical condition, the transverse beam are horizontally lifted, the left and right ends of the transverse beam are respectively aligned with tops of the two vertical beams, and then the two vertical beams are fixed to the transverse beam. However, this assembly method is very difficult to operate because both the transverse beam and the two vertical beams are in a lifting state during assembly, which results in difficulty during the alignment, thusly taking a long-time during assembly. In the present solution, the transverse beam and the vertical beam are assembled in a hinge-like fashion. When assembling on the operation site, the two vertical beams are aligned with the transverse beam on the ground, and then each of vertical beams is hinged to the transverse beam by hinge axes. After that, the transverse beam is lifted horizontally, so that the two vertical beams rotate relative to the transverse beam under its own gravity. After rotating to a preset assembly position, the vertical beams are fixed to the transverse beam are fixed, such that the assembly work of the gantry is completed. This above design greatly reduces the operation difficulty of the gantry assembly and greatly reduces the time required for the assembly work.

In any of the above technical solutions, preferably, the first wheel and the second wheel are respectively rotatable, relative to the first vertical beam in a horizontal direction till the axes thereof extending in the front-rear direction; the third wheel and the fourth wheel are respectively rotatable, relative to the second vertical beam in the horizontal direction till the axes thereof extending in the front-rear direction.

When assembling the rack, at first, the first vertical beam is assembled with the fixed beam, and the second vertical beam is assembled with the swing beam. Then, the two vertical beams are respectively hinged to the transverse beam, and orientation of the wheels is adjusted such that the axes of the wheels extend in the front-rear direction. Then the transverse beam is lifted horizontally, meanwhile the vertical beams rotate around the hinge axes. Here, the wheels rolls with the movement of the vertical beams, which could avoid friction between the bottom of the vertical beam and the ground, therefore it is more convenient for assembly and can prevent the vertical beam and the ground from being damaged.

In any of the above technical solutions, preferably, a first centering protrusion is provided at a front surface and a rear surface of the transverse beam at the left end thereof, and a second centering protrusion is provided at the first vertical beam. When the first vertical beam rotates relative to the transverse beam till to an assembly position, the first centering protrusion against the second centering protrusion to form a limit in the front-rear direction; a third centering protrusion is provided at the front surface and the rear surface of the transverse beam at the right end thereof, and a fourth centering protrusion is provided at the second vertical beam. When the second vertical beam rotates relative to the transverse beam till to the assembly position, the third centering protrusion against the fourth centering protrusion to form the limit in the front-rear direction.

In the present solutions, when the vertical beams and the transverse beam reach the assembly position, the centering protrusions are against correspondingly with each other to form the limit in the front-rear direction, thereby controlling the relative positions of the vertical beams and the transverse beam in the front-rear direction (that is, positions of the vertical beams at the hinge axes), thusly ensuring the accuracy of the relative positions of the radiation source mounted at the first vertical beam, the vertical detector cabin mounted at the second vertical beam and the horizontal detector cabin mounted at the transverse beam so as to ensure the scanning imaging effect of the inspection device.

Specifically, a surface of the first centering protrusion and a surface of the second centering protrusion are against with each other, which are inclined surface matched with each other, and a distance from the inclined surface to the first vertical beam gradually increases from top to bottom. A surface of the third centering protrusion and a surface of the fourth centering protrusion are against with each other, which are inclined surface matched with each other, and a distance from the inclined surface to the second vertical beam gradually increases from top to bottom. During assembly, the vertical beams rotate relative to the transverse beam till two matched centering protrusions are in contact with each other, the inclined surfaces thereof are against with each other so as to play a guide role, so that the vertical beams could slide to middle of the hinge axes along the hinge axes, thereby completing centering work of the vertical beam.

In any of the above technical solutions, preferably, the horizontal detector cabin and the vertical detector cabin are detachably connected to the transverse beam and the second vertical beam respectively, and the vertical detector cabin is rotatably connected to the horizontal detector cabin.

At present, the radiation scanning inspection device is provided with the horizontal detector cabin and the vertical detector cabin perpendicular to each other, which occupy a relatively large space length in lateral and/or longitudinal in horizontal and vertical directions, resulting in inconvenient of device exchange and transportation. In the present solution, the vertical detector cabin and the horizontal detector cabin are rotatably connected. When transporting or changing a site, the vertical detector cabin and the horizontal detector cabin can be folded together by rotating the vertical detector cabin or the horizontal detector cabin to reduce the space length occupied by two detector cabins in lateral and/or longitudinal direction, thereby facilitating device exchange or transportation.

In any of the above technical solutions, preferably, the radiation source includes a shielding case including a case body and a collimator, wherein the case body is mounted on the first vertical beam, the case body is provided with a mounting cavity and a ray outlet in communication with the mounting cavity, the collimator is fixedly mounted on the case body, wherein the case body comprises a slit-is aligned with the ray outlet; and a radiation source body, mounted in the mounting cavity, wherein the mounting cavity comprises an outlet aligned with the ray outlet.

At present, the shielding case and the collimator are two independent components, and are respectively mounted at the rack of the inspection device, therefore it is difficult to ensure the accuracy of the relative positions of the shielding case and the collimator, which may affect the scanning imaging effect of the inspection device. The present solutions provide an integrated configuration of the shielding case and the collimator, wherein the shielding case includes the case body and the collimator. The collimator is fixedly mounted on the case body to ensure the accuracy of the relative positions of the collimator and the case body, so that the slit of the collimator is aligned with the ray outlet at the case body, which allow the ray beam passing through the collimator to conform design standards, thusly ensuring the quality of the scanning image of self-propelled container and/or vehicle inspection device.

Specifically, the radiation source body is generally selected from an electronic induction reducer, an electron linear accelerator or an isotope radiation source. In case that the radiation source body is selected from the electronic induction reducer or the electron linear accelerator, the accelerator is connected to the controller and the power supply apparatus, and operating state of the accelerator is controlled by the controller so as to control the start and end of scanning. In case that the radiation source is selected from Cobalt 60 etc., isotope radiation source, an electric control door needs to be mounted at the shielding case or a mounting cabin of the radiation source, which is connected with the power supply apparatus and the controller, and the electronic control door is controlled to be open and closed by the controller so as to control the start and end of the scanning.

In any of the above technical solutions, preferably, the power supply apparatus comprises a cable reel and/or a fuel generator.

In case that a scanning work site is provided with an external power supply, power is supplied by a cable reel connected to the external power supply. In case that there is no external power supply at the scanning work site, power is supplied by a fuel generator. The power supply mode can be switched between the cable reel mode and the fuel generator mode by a manual switch, or an automatical switch by the controller. That is, when the cable reel is powered off, the power supply mode of the fuel generator is automatically turned on, and when the cable reel receives current, power supply mode automatically switched to the cable reel mode.

In any of the above technical solutions, preferably, the self-propelled container and/or vehicle inspection device further includes: two steering motors, connected to the first wheel and the third wheel respectively or connected to the second wheel and the fourth wheel respectively, wherein the steering motors are used to push the wheels to rotate in the horizontal direction relative to the gantry, and each of the two steering motors is connected to the power supply apparatus and the controller respectively.

In this embodiment, the two steering motors can push two front wheels or the two rear wheels of the inspection device to rotate horizontally to control a travelling direction of the inspection device or to steer the inspection device, thereby making the inspection device more flexible and applicable for different vehicles or containers, or manipulating the self-propelled container and/or vehicle inspection device to replace work site.

In any of the above technical solutions, preferably, the self-propelled container and/or vehicle inspection device further includes a radiation shielding component, mounted on the gantry for blocking unwanted rays; wherein, the radiation shielding component includes a first shielding body, mounted at the second vertical beam and located at a side of the vertical detector cabin facing away from away from the radiation source; a second shielding body, mounted at the first vertical beam and located between the radiation source and the vertical detector cabin, wherein the second shielding body is provided with a slit extending in a up and down direction, and the slit is aligned with the ray outlet of the radiation source; a vertical ray trap, mounted at the second vertical beam, wherein the vertical ray trap is located at the side of the vertical detector cabin facing away from the radiation source and facing the vertical detector cabin; a horizontal ray trap, mounted at the transverse beam, which is located above the horizontal detector cabin and exactly facing the horizontal detector cabin; a first protective layer, arranged at a front cabin wall and a rear cabin wall of the vertical detector cabin; and a second protective layer, arranged at a front cabin wall and a rear cabin wall of the horizontal detector cabin.

In these solutions, the radiation shielding component is provided at the self-propelled container and/or vehicle inspection device without occupying the space of scanning inspection site, which could meet needs of small site operation for the inspection device. And, the radiation shielding component is provided at the self-propelled container and/or vehicle inspection device, which could move with the self-propelled container and/or vehicle inspection device. Therefore, it is unnecessary to rebuild a radiation shielding wall or other radiation shielding facilities in case that work site of the inspection device is replaced, which reduces use cost of the inspection device, thereby improving market competitiveness of product. Wherein, the first shielding body and the second shielding body are generally selected form steel plates or lead plates, and materials of the horizontal ray trap, the vertical ray trap, the first protective layer and the second protective layer are preferably plumbum.

In any of the above technical solutions, preferably, the rack is provided with a passage through which the container or vehicle to be inspected passes, and the self-propelled container and/or vehicle inspection device further includes an anti-collision device; wherein, the anti-collision device includes: a passage detecting component, mounted in the passage and connected to the power supply apparatus and the controller for inspecting whether the container and/or the vehicle to be inspected biased to the passage, and transmitting a detector signal to the controller; an obstacle detecting component, mounted on an edge of the rack and connected to the power supply apparatus and the controller, and used for detecting whether an obstacle exists in a preset range in a traveling direction of the self-propelled container and/or vehicle inspection device, and transmitting the detector signal to the controller; and four protective door components, respectively mounted at a front end of the left and right sides of the rack and a rear end of the left and right sides and located in the passage, wherein each of the protective door components includes a trigger door hinged to the rack and the detectors cooperating with the trigger door, the detectors are used for transmitting a detector signal to the controller when the inspected containers and/or the inspected vehicles hit the trigger door.

The present solutions realize active collision avoidance function by the passage detecting component and the obstacle detecting component, and realize passive collision avoidance function by the protective door components. Detecting components are provided to detect whether an object to be inspected is aligned with the passage so as to avoid the object to be inspected colliding with the inspection device. The obstacle detecting component is used to detect whether there is the obstacle on the route of the inspection device, and to avoid the inspection device colliding with the obstacle. The protective door components are mounted in the passage. During detecting, if there is a problem with relative movement direction of the inspection device and containers and/or vehicles, before the containers and/or the vehicles collide with the inspection device, the containers and/or the vehicles will first hit the trigger doors, causing the trigger doors to rotate. When the trigger doors are turned to or exceed a preset angle and/or a preset position, the detectors send a trigger signal to the controller, and when the controller receives the trigger signal, a corresponding program is triggered. For example, controlling stop, advance, sending out alarm of the inspection device, the inspection device and the inspected object are prevented from colliding, and the inspection device and the inspected object are prevented from being damaged. Wherein, the detecting device can select a travel switch.

In any of the above technical solutions, preferably, the self-propelled container and/or vehicle inspection device further includes a plurality of signal acquisition cameras, respectively mounted at the rack, and each of the signal acquisition cameras is respectively connected to the power supply device and the controller for collecting a box number of the inspected containers and/or a plate number of the inspected vehicles.

In any of the above technical solutions, preferably, the self-propelled container and/or vehicle inspection device further comprises: a plurality of monitors, respectively mounted at front, rear, left and right sides of the rack, and each of the monitors is respectively connected to the power supply apparatus and the controller, and used for monitoring situation around the self-propelled container and/or vehicle inspection device.

In any of the above technical solutions, preferably, the self-propelled container and/or vehicle inspection device further comprises: a data transmission device, used for connecting to a remote console and performing data transmission with the remote console; wherein, the data transmission apparatus comprises a transmission fiber and/or a wireless transmission device.

In these solutions, the data transmission is performed by the data transmission device and the remote console to transmit inspection scanning patterns of the containers and/or the vehicles and data collected by the signal acquisition cameras and the monitors to the remote console for review by the staffs. And the remote console may send a control signal to the self-propelled container and/or vehicle inspection device by the data transmission device to control working state of the inspection device, thereby implementing remote control.

In any of the above technical solutions, preferably, the self-propelled container and/or vehicle inspection device further includes a housing control box, mounted at the rack and connected to the controller for sending control commands to the controller and/or controlling start and stop of the power supply apparatus; and/or a wireless control device, capable of wirelessly transmitting with the controller, and used for sending control commands to the controller and/or controlling start and stop of the power supply apparatus.

When the self-propelled container and/or vehicle inspection device works, in order to ensure safety, it is usually necessary for the staffs to monitor on site. When the inspection device is in danger of colliding or other unexpected conditions, the staffs on site can control the inspection device by the housing control box and/or the wireless control device to cope with unexpected situations. Wherein, the distance between the staffs on site and the inspection device is pulled apart by a control device of the wireless control device, which can reduce the risk of on-site work.

In any of the above technical solutions, preferably, the self-propelled container and/or vehicle inspection device further includes a temperature control device, and the temperature control device comprises: a detector cabin air conditioning system, connected to the controller and the power supply apparatus, and communicated to the vertical detector cabin and the horizontal detector cabin for controlling a temperature in the vertical detector cabin and the horizontal detector cabin; and a radiation source air conditioning system, wherein the first vertical beam is provided with a mounting cabin for mounting the ray source, and the radiation source air conditioning system is connected to the controller and the power supply apparatus, and communicated to the mounting cabin for controlling the temperature of the mounting cabin.

The radiation source air conditioning system is used for controlling temperature of the mounted cabin of the radiation source within a preset range, the detector cabin air conditioning system is used for controlling the temperature of two detector cabins within the preset range, so that the self-propelled container and/or vehicle inspection device can operate in hot and cold natural environment.

In any of the above technical solutions, preferably, the self-propelled container and/or vehicle inspection device further comprises: an automatic navigation device, connected to the power supply apparatus and the controller, and used for setting a preset travelling route of the self-propelled container and/or vehicle inspection device and detecting whether the self-propelled container and/or vehicle inspection device deviates from the preset travelling route. At the same time the automatic navigation device sends the detector signal to the controller, so that the controller controls the traveling direction of the self-propelled container and/or vehicle inspection device according to the detector signal.

The automatic navigation device usually includes a device positioning device and a detecting device for detecting object positions, wherein the device positioning device is used for determining position coordinates of the inspection device, and the detecting device for detecting object positions is used for detecting positions of the inspected containers and/or inspected vehicles. Specifically, the device positioning device may adopt a GPS, and the detecting device for detecting object positions may adopt a photoelectric ranging sensor. GPS detects current position coordinates of the inspected device and transmits coordinates information of the inspected equipment to the controller. The photoelectric ranging sensor measures distance between the inspected object and the inspection device and transmits distance information to the controller, so that the controller calculates the position coordinates of the inspected object according to the coordinate information of the inspection device and above distance information. And the controller sets the preset travelling route according to the coordinate information of the inspected object and the distance of the inspection device, subsequently, the inspected device is controlled to advance along the preset travelling route. During traveling, GPS detects the position coordinates of the inspection device in real time and sends it to the controller. When the controller finds that the position coordinates of the inspection device deviates from the preset travel rout, traveling route of the inspection device may be corrected by adjusting difference in speed between left and right driving motors of by controlling steering motors to drive the inspected device to turn. Based on this, the automatic navigation device can also cooperate with the obstacle detecting component. When the obstacle detecting component finds an obstacle on the traveling route of the device, the detecting device for detecting object positions and the controller obtain the position coordinates of the obstacle according to above-described detecting principle. The controller resets the preset travelling route according to coordinates of the inspection device, the obstacle, and the inspected containers and/or the vehicles, so that the inspection device can automatically bypass the obstacle during travelling.

In any of the above technical solutions, preferably, the self-propelled container and/or vehicle inspection device further includes a vehicle position detecting device, connected to the power supply apparatus, and used for detecting a position of the inspected vehicle.

The inspection device is provided with a quick check mode when inspecting the vehicles. During quick check, the inspection device is stationary, and each of the inspected vehicles passes through the passage of the inspection device in turn. In order to prevent the ray beam from being irradiated to driver of the vehicles, the inspection device mounts the vehicle position detecting device in the passage. The inspected vehicles are all trunks, and there is a gap between head and box of trunks. The vehicle position detecting device usually uses a photoelectric sensor, and sensor position is in a vertical plane where the ray beam is located. When detecting light of sensor is irradiated into above gap, it is proved that the head of trunks has passed a ray exit position, and the sensor sends a signal to the controller, so that the controller controls the radiation source to emit rays and starts scanning. When the box of trunks passes completely the ray exit position, the detected light of the sensor is no longer blocked by the box of trunks. At this time, the sensor sends a signal to the controller, so that the controller controls the radiation source to stop emitting rays and stops the scanning work.

In any of the above technical solutions, preferably, the self-propelled container and/or vehicle inspection device further comprises: a radioactive substance detecting device, connected to the power supply apparatus, and used for detecting whether a radioactive substance exists in the inspected container and/or the inspected vehicle.

In any of the above technical solutions, preferably, the self-propelled container and/or vehicle inspection device further comprises: an infrared thermal scanning device, connected to the power supply apparatus and the controller, and used for performing thermal scanning on the inspected container and/or the inspected vehicle.

In any of the above technical solutions, preferably, the self-propelled container and/or vehicle inspection device further comprises: a biochemical dangerous article detecting device, connected to the power supply device and the controller, and used for detecting whether there is biochemical dangerous articles in the inspected container and/or the inspected vehicle.

If there are biological dangerous articles (biotoxic gas, etc.) and chemical dangerous articles (flammable and explosive substances, chemical poison gas, etc.) in the inspected object, these dangerous articles will volatilize a certain amount of gas. The biochemical dangerous article detecting device comprises gas collecting device arranged in the passage. When the inspected object passes the passage, the gas collecting device performs gas production, and the biochemical dangerous article detecting device performs inspection and analysis on gas samples to determine whether the biochemical dangerous articles are contained in the containers and/or the vehicles.

In any of the above technical solutions, preferably, the self-propelled container and/or vehicle inspection device further comprises: a multi-information integration device connected to the power supply device and the controller, and used for integrating detection images of each of detector devices with radiation scanning images.

In these solutions, the multi-information integration device integrates the radiation scanning images, infrared thermal scanning images, radioactive material inspection information, and biochemical dangerous article detecting into one image for review by the staffs.

Additional aspects and advantages of the present disclosure will be apparent from the following description or will be understood by practice of the present disclosure.

BRIEF DESCRIPTION OF THE DRAWINGS

The above and/or additional aspects and advantages of the present disclosure will be apparent and easy to understand from the description of embodiments in conjunction with the following drawings, wherein.

Wherein, the correspondence between the reference numerals and component names in FIG. 1 to FIG. 7 is:

1 transverse beam, 2 first vertical beam, 3 second vertical beam, 4 fixed beam, 5 swing beam, 6 horizontal detector cabin, 7 vertical detector cabin, 8 driving motors, 9 steering motors, 10 first shielding body, 11 second shielding body, 12 monitors, 13 trigger doors, 14 first hinge shaft, 15 second hinge shaft, 16 first centering protrusion, 17 second centering protrusion, 18 third centering protrusion, 19 fourth centering protrusion, 20 case body, 21 collimator.

DETAILED DESCRIPTION

In order to better understand the above-mentioned purposes, features and advantages of the present disclosure, and the present disclosure is described in further detail in connection with the accompanying drawings and specific embodiments. It should be noted that, in the absence of conflict, embodiments of this application and the features of the embodiments may be combined with each other.

Many specific details are described in the following description to facilitate a full understanding of the present disclosure, but the present disclosure may also be implemented in other ways different from those described herein, therefore the scope of protection of the present disclosure is not limited by the specific embodiments disclosed below.

As shown in FIG. 1 to FIG. 4, the self-propelled container and/or vehicle inspection device provided by an embodiment of the present solutions includes a rack, a power supply apparatus, a radiation source, a detector cabin, at least two driving motors 8, and a controller.

The rack includes a gantry, a fixed beam 4 and a swing beam 5, and the gantry includes a transverse beam 1 and a first vertical beam 2 and a second vertical beam 3 arranged at left and right ends of the transverse beam 1, the fixed beam 4 is arranged in a front-rear direction and is fixedly connected to the first vertical beam 2, and a first wheel and a second wheel are respectively mounted at front and rear ends of the fixed beam 4, the swing beam 5 is arranged in the front-rear direction and is rotatably connected to the second vertical beam 3, such that the swing beam 5 could rotate in a vertical direction relative to the second vertical beam 3, and a third wheel and a fourth wheel are respectively mounted at front and rear ends of the swing beam 5. The power supply apparatus is mounted on the rack. The radiation source is mounted on the first vertical beam 2 and connected to the power supply apparatus, and used for generating a ray beam. The detector cabin includes a horizontal detector cabin 6 mounted on the transverse beam 1 and a vertical detector cabin 7 mounted at the second vertical beam 3, wherein detector arrays are mounted in the horizontal detector cabin 6 and the vertical detector cabin 7, each of detectors is respectively connected to the power supply apparatus, and respectively aligned with a center of the ray beam. The at least two driving motors 8 are respectively connected to the power supply apparatus, wherein each of the driving motors 8 is connected to one wheel, and wheels connected to each of the driving motors 8 are different with each other, the driving motors 8 are used to drive the wheels around with the axes thereof to rotate. The controller is connected to the power supply apparatus, the radiation source, each of the detectors and each of the driving motors 8.

The self-propelled container and/or vehicle inspection device provided by the present solution includes the rack, the power supply apparatus, the radiation source, the detector cabin, at least two driving motors 8, and the controller. The power supply apparatus is used for supplying power to each electrical device. The detector cabin includes the horizontal detector cabin 6 and the vertical detector cabin 7, wherein the detector arrays are mounted in two detector cabins, each of the detectors is respectively aligned with the center of the ray beam, and the detector array is used for receiving the ray beam and converting it into radiation scanning images. The fixed beam 4, the first vertical beam 2, the transverse beam 1 and the second vertical beam 3 of the rack are fixed together, and each of the front and rear ends of the fixed beam 4 is mounted with one wheel which is always close to ground. The swinging beam 5 is rotatably mounted at the bottom of the second vertical beam 3 to form a balanced suspension. Each of the front and rear ends of the swinging beam 5 is mounted with one wheel. When the ground under the device is not flat, the swinging beam 5 will rotate correspondingly with relative to the second vertical beam 3 to ensure the two wheels at the swinging beam 5 are always close to the ground, such that the rack is evenly stressed to prevent the rack from being twisted and deformed, thereby ensuring relative positions of the first vertical beam 2, the transverse beam 1 and the second vertical beam 3 are unchanged, and ensuring the accuracy of the relative positions of the detectors and the radiation source, and ensuring effect of the scanning image of the self-propelled container and/or vehicle inspection device. Specifically, the transverse beam 1 and vertical beams generally use a rectangular frame structure comprising at least two main beams parallel to each other and a support beam supported to each of the main beams.

The present solution removes the cab of the inspection device, the controller connects and controls the driving motors 8 of the wheels for operation according to a set program so as to drive the wheels to rotate, thusly controlling the self-propelling of the inspection device. Consequently, staffs are not required to drive within the cab, thusly eliminating any anxiety of the staff.

Figure 2:
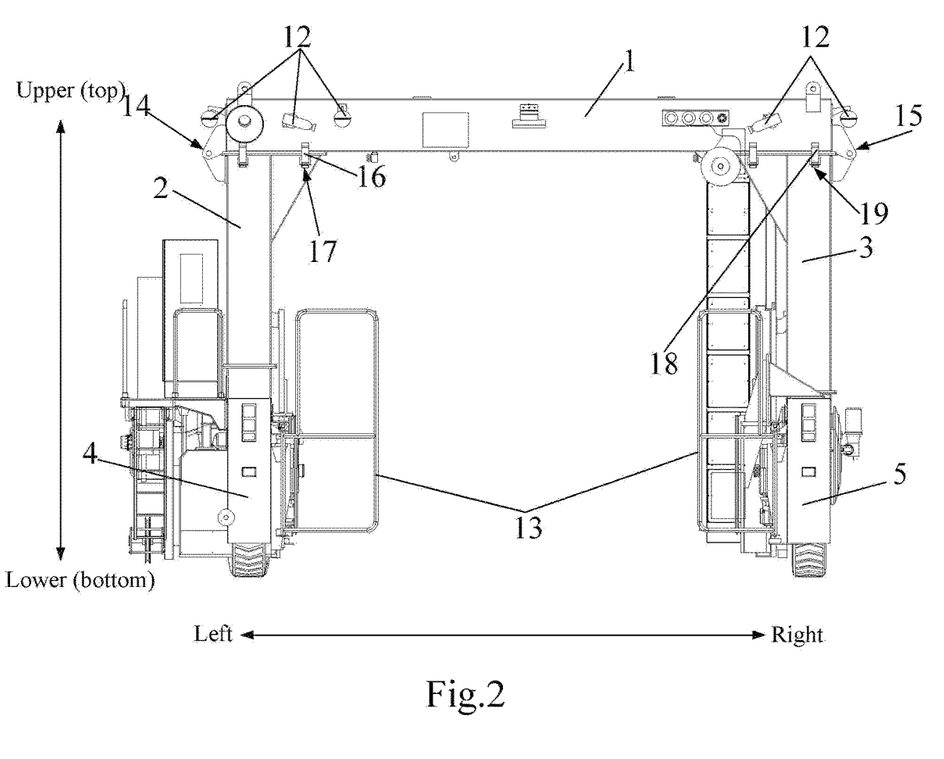
FIG. 2 is a schematic structural view of another angle of the self-propelled container and/or vehicle inspection device as shown in FIG. 1.
Figure 3:
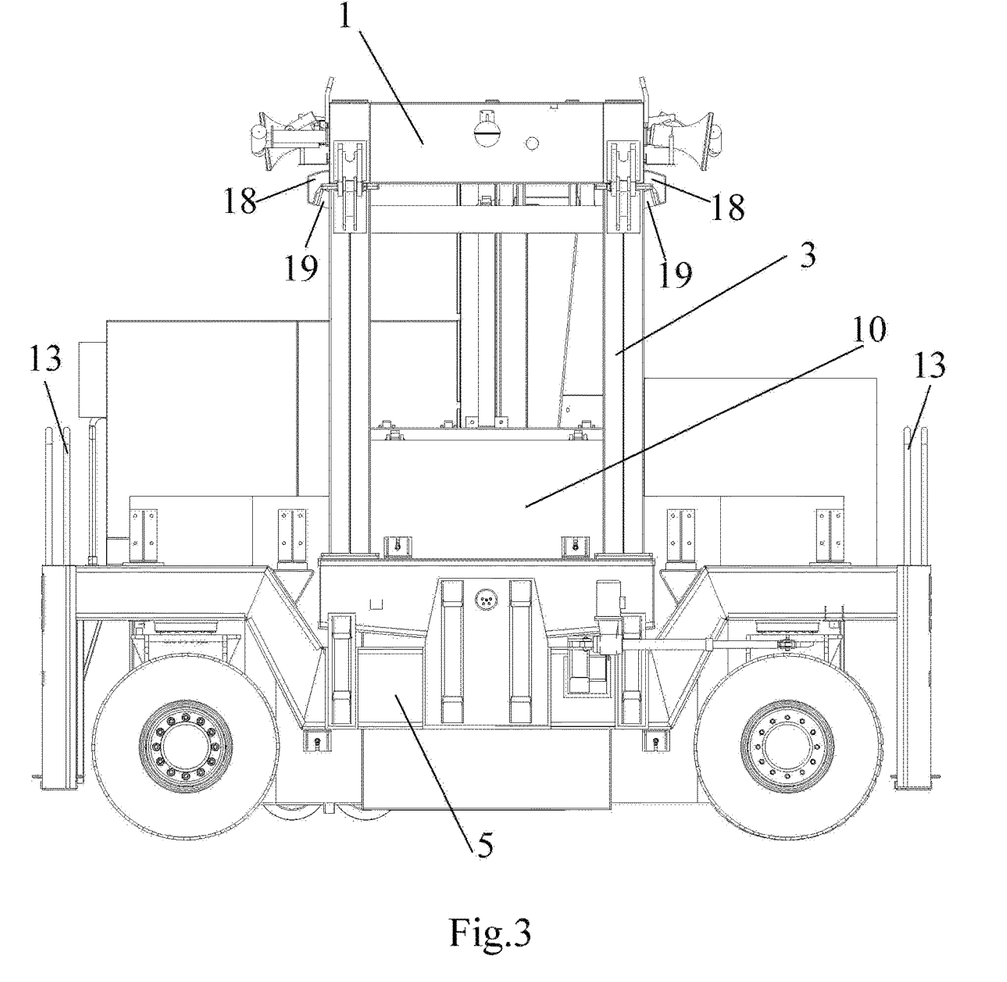
FIG. 3 is a right schematic structural view of the self-propelled container and/or vehicle inspection device as shown in FIG. 2.

As shown in FIG. 2 and FIG. 3, in above technical solution, preferably, the first vertical beam 2 is detachably hinged to the transverse beam 1 by a first hinge shaft 14; the second vertical beam 3 is detachably hinged to the transverse beam 1 by a second hinge shaft 15.

At present, due to the large size of the gantry, the transverse beam 1 and two vertical beams are usually transported in a disassembled state and then assembled at a scanning operation site. During assembly, the two vertical beams need to be lifted in a vertical condition, the transverse beam 1 are horizontally lifted, the left and right ends of the transverse beam 1 are respectively aligned with tops of the two vertical beams, and then the two vertical beams are fixed to the transverse beam 1. However, this assembly method is very difficult to operate because both the transverse beam 1 and the two vertical beams are in a lifting state during assembly, which results in difficulty during the alignment, thusly taking a long-time during assembly. In the present solution, the transverse beam 1 and the vertical beam are assembled in a hinge-like fashion. When assembling on the operation site, the two vertical beams are aligned with the transverse beam 1 on the ground, and then each of vertical beams is hinged to the transverse beam 1 by hinge axes. After that, the transverse beam 1 is lifted horizontally, so that the two vertical beams rotate relative to the transverse beam 1 under its own gravity. After rotating to a preset assembly position, the vertical beams are fixed to the transverse beam 1, such that the assembly work of the gantry is completed. This above design greatly reduces the operation difficulty of the gantry assembly and greatly reduces the time required for the assembly work.

In any of the above technical solutions, preferably, the first wheel and the second wheel are respectively rotatable, relative to the first vertical beam 2 in a horizontal direction till the axes thereof extending in the front-rear direction; the third wheel and the fourth wheel are respectively rotatable, relative to the second vertical beam 3 in the horizontal direction till the axes thereof extending in the front-rear direction.

When assembling the rack, at first, the first vertical beam 2 is assembled withthe fixed beam 4, and the second vertical beam 3 is assembled with the swinging beam 5. Then, the two vertical beams are respectively hinged to the transverse beam 1, and orientation of the wheels is adjusted such that the axes of the wheels extend in the front-rear direction. Then the transverse beam 1 is lifted horizontally, meanwhile the vertical beams rotate around the hinge axes. Here, the wheels rolls with the movement of the vertical beams, which could avoid friction between the bottom of the vertical beam and the ground, therefore it is more convenient for assembly and can prevent the vertical beam and the ground from being damaged.

As shown in FIG. 2 and FIG. 3, in any of the above technical solutions, preferably, a first centering protrusion 16 is provided at a front surface and a rear surface of the transverse beam 1 at the left end thereof, and a second centering protrusion 17 is provided at the first vertical beam 2. When the first vertical beam 2 rotates relative to the transverse beam 1 till to an assembly position, the first centering protrusion 16 against the second centering protrusion 17 to form a limit in the front-rear direction; a third centering protrusion 18 is provided at the front surface and the rear surface of the transverse beam 1 at the right end thereof, and a fourth centering protrusion 19 is provided at the second vertical beam 3. When the second vertical beam 3 rotates relative till to the transverse beam 1 to the assembly position, the third centering protrusion 18 against the fourth centering protrusion 19 to form the limit in the front-rear direction.

In the present solutions, when the vertical beams and the transverse beam 1 reach the assembly position, the centering protrusions are against correspondingly with each other to form the limit in the front-rear direction, thereby controlling the relative positions of the vertical beams and the transverse beam 1 in the front-rear direction (that is, positions of the vertical beams at the hinge axes), thusly ensuring the accuracy of the relative positions of the radiation source mounted at the first vertical beam 2, the vertical detector cabin 7 mounted at the second vertical beam 3 and the horizontal detector cabin 6 mounted at the transverse beam 1, so as to ensure the scanning imaging effect of the inspection device.

Specifically, a surface of the first centering protrusion 16 and a surface of the second centering protrusion 17 are against with each other, which are inclined surface matched with each other, and a distance from the inclined surface to the first vertical beam 2 gradually increases from top to bottom. A surface of the third centering protrusion 18 and a surface of the fourth centering protrusion 19 are against with each other, which are inclined surface matched with each other, and a distance from the inclined surface to the second vertical beam 3 gradually increases from top to bottom. During assembly, the vertical beams rotate relative to the transverse beam 1 till two matched centering protrusions are in contact with each other, the inclined surfaces thereof are against with each other so as to play a guide role, so that the vertical beams could slide to middle of the hinge axes along the hinge axes, thereby completing centering work of the vertical beam.

Figure 6:
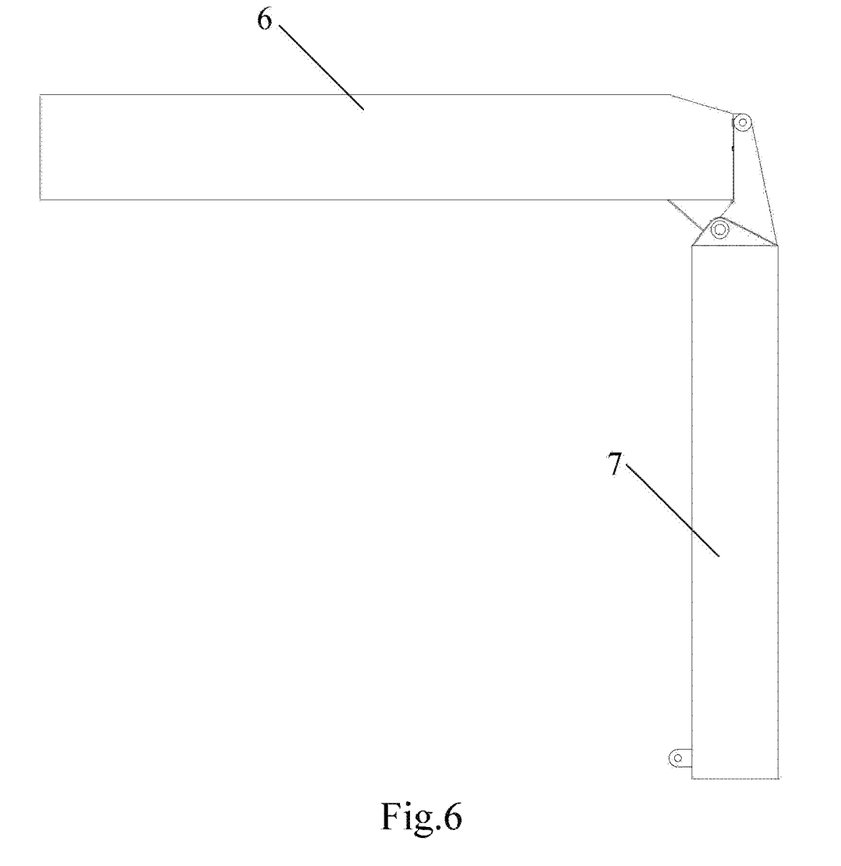
FIG. 6 is a schematic structural view of a horizontal detector cabin and the vertical detector cabin in an unfolded state as shown in FIG. 1.
Figure 7:
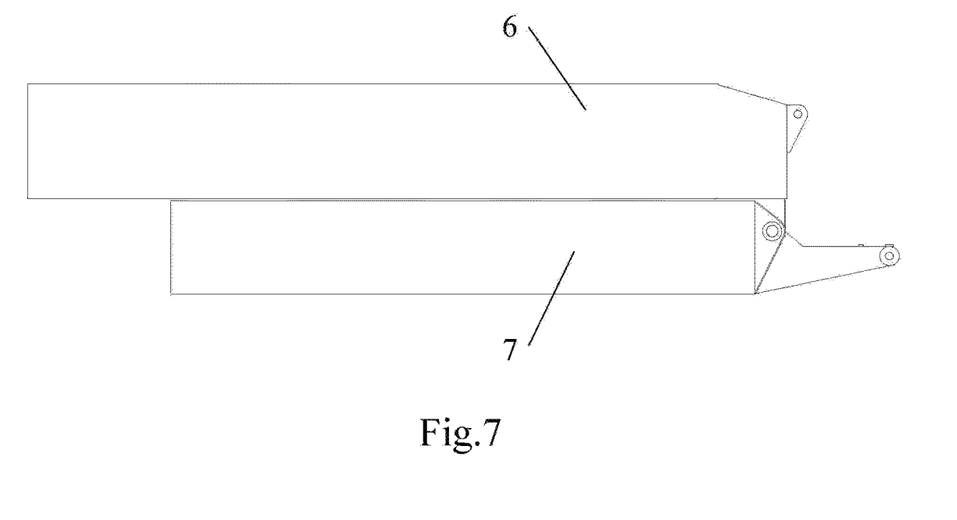
FIG. 7 is a schematic structural view of the horizontal detector cabin and the vertical detector cabin in a folded state as shown in FIG. 6.

As shown in FIG. 6 and FIG. 7, in any of the above technical solutions, preferably, the horizontal detector cabin 6 and the vertical detector cabin 7 are detachably connected to the transverse beam 1 and the second vertical beam 3 respectively, and the vertical detector cabin 7 is rotatably connected to the horizontal detector cabin 6.

At present, the radiation scanning inspection device is provided with the horizontal detector cabin 6 and the vertical detector cabin 7 perpendicular to each other, which occupy a relatively large space length in lateral and/or longitudinal directions, resulting in inconvenient of device exchange and transportation. In the present solution, the vertical detector cabin 7 and the horizontal detector cabin 6 are rotatably connected. When transporting or changing a site, the vertical detector cabin 7 and the horizontal detector cabin 6 can be folded together by rotating the vertical detector cabin 7 or the horizontal detector cabin 6 to reduce the space length occupied by two detector cabins in lateral and/or longitudinal direction, thereby facilitating device exchange or transportation.

Figure 5:
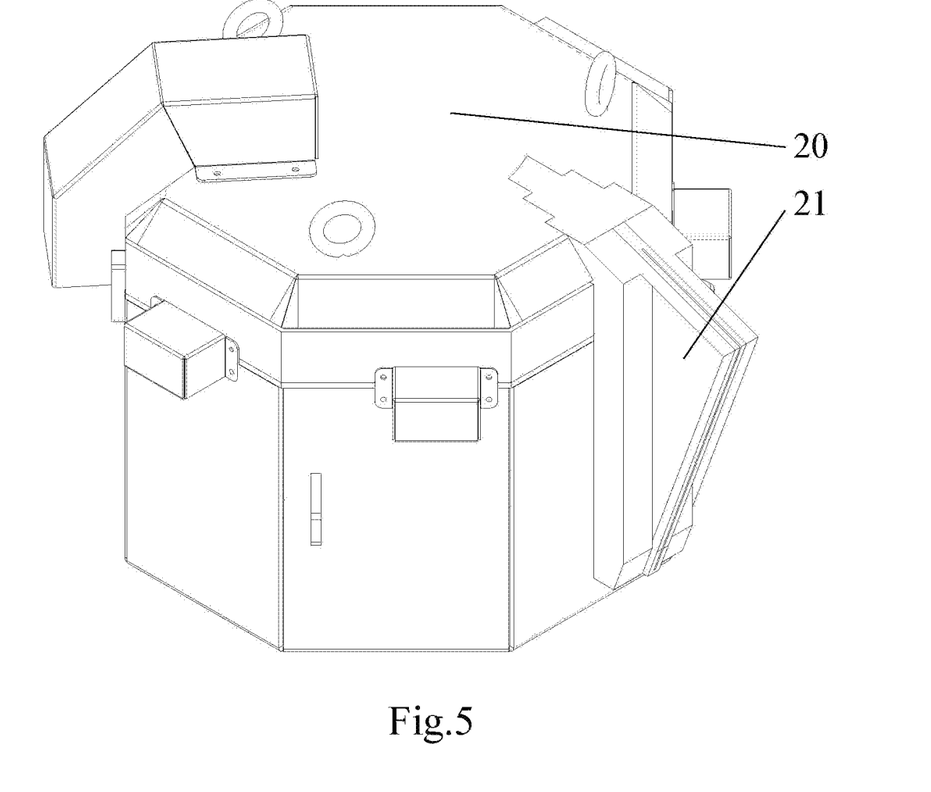
FIG. 5 is a schematic structural view of a shielding case provided by an embodiment of the present disclosure.

As shown in FIG. 5, in any of the above technical solutions, preferably, the radiation source includes a shielding case and a radiation source body. The shielding case includes a case body 20 and a collimator 21, wherein the case body 20 is mounted on the first vertical beam, the case body 20 is provided with a mounting cavity and a ray outlet in communication with the mounting cavity, the collimator 21 is fixedly mounted on the case body 20, wherein the case body 20 comprises a slit aligned with the ray outlet. The radiation source body is mounted in the mounting cavity, wherein the mounting cavity comprises an outlet is aligned with the ray outlet.

At present, the shielding case and the collimator 21 are two independent components, and are respectively mounted at the rack of the inspection device, therefore it is difficult to ensure the accuracy of the relative positions of the shielding case and the collimator 21, which may affect the scanning imaging effect of the inspection device. The present solutions provide an integrated configuration of the shielding case and the collimator 21, wherein the shielding case includes the case body 20 and the collimator 21. The collimator 21 is fixedly mounted on the case body 20 to ensure the accuracy of the relative positions of the collimator 21 and the case body 20, so that the slit of the collimator 21 is aligned with the ray outlet at the case body 20, which allow the ray beam passing through the collimator 21 to conform design standards, thusly ensuring the quality of the scanning image of self-propelled container and/or vehicle inspection device.

Specifically, the radiation source body is generally selected from an electronic induction reducer, an electron linear accelerator or an isotope radiation source. In case that the radiation source body is selected from the electronic induction reducer or the electron linear accelerator, the accelerator is connected to the controller and the power supply apparatus, and operating state of the accelerator is controlled by the controller so as to control the start and end of scanning. In case that the radiation source is selected from Cobalt 60 etc., isotope radiation source, an electric control door needs to be mounted at the shielding case or a mounting cabin of the radiation source, which is connected with the power supply apparatus and the controller, and controlled to be open or closed by the controller so as to control the start and end of the scanning.

In any of the above technical solutions, preferably, the power supply apparatus comprises a cable reel and/or a fuel generator.

In case that a scanning work site is provided with an external power supply, power is supplied by a cable reel connected to the external power supply. In case that there is no external power supply at the scanning work site, power is supplied by a fuel generator. The power supply mode can be switched between the cable reel mode and the fuel generator mode by a manual switch or an automatical switch by the controller. That is, when the cable reel is powered off, the power supply mode of the fuel generator is automatically turned on, and when the cable reel receives current, power supply mode is automatically switched to the cable reel mode.

Figure 1:
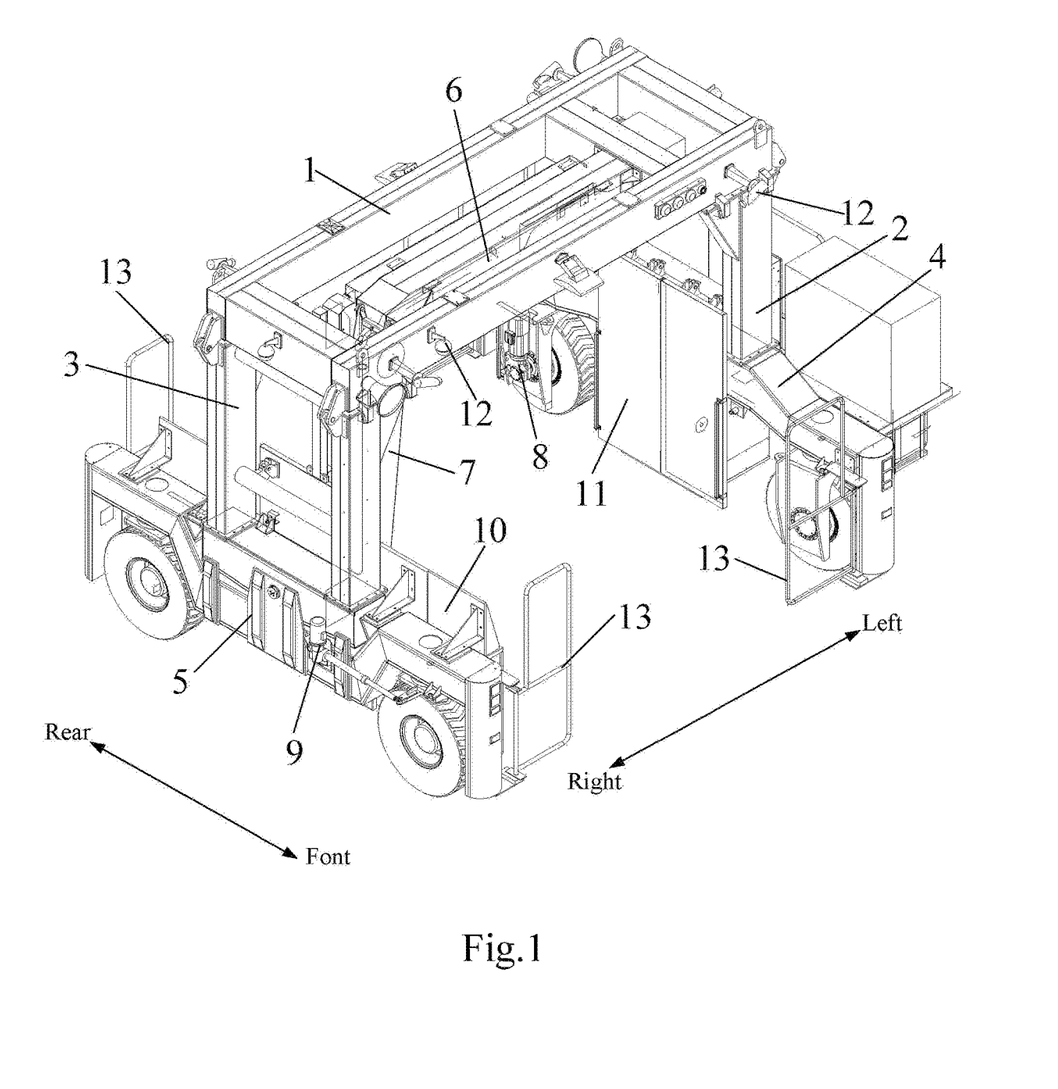
FIG. 1 is a schematic structural view of a self-propelled container and/or vehicle inspection device provided by an embodiment of the present disclosure.
Figure 4:
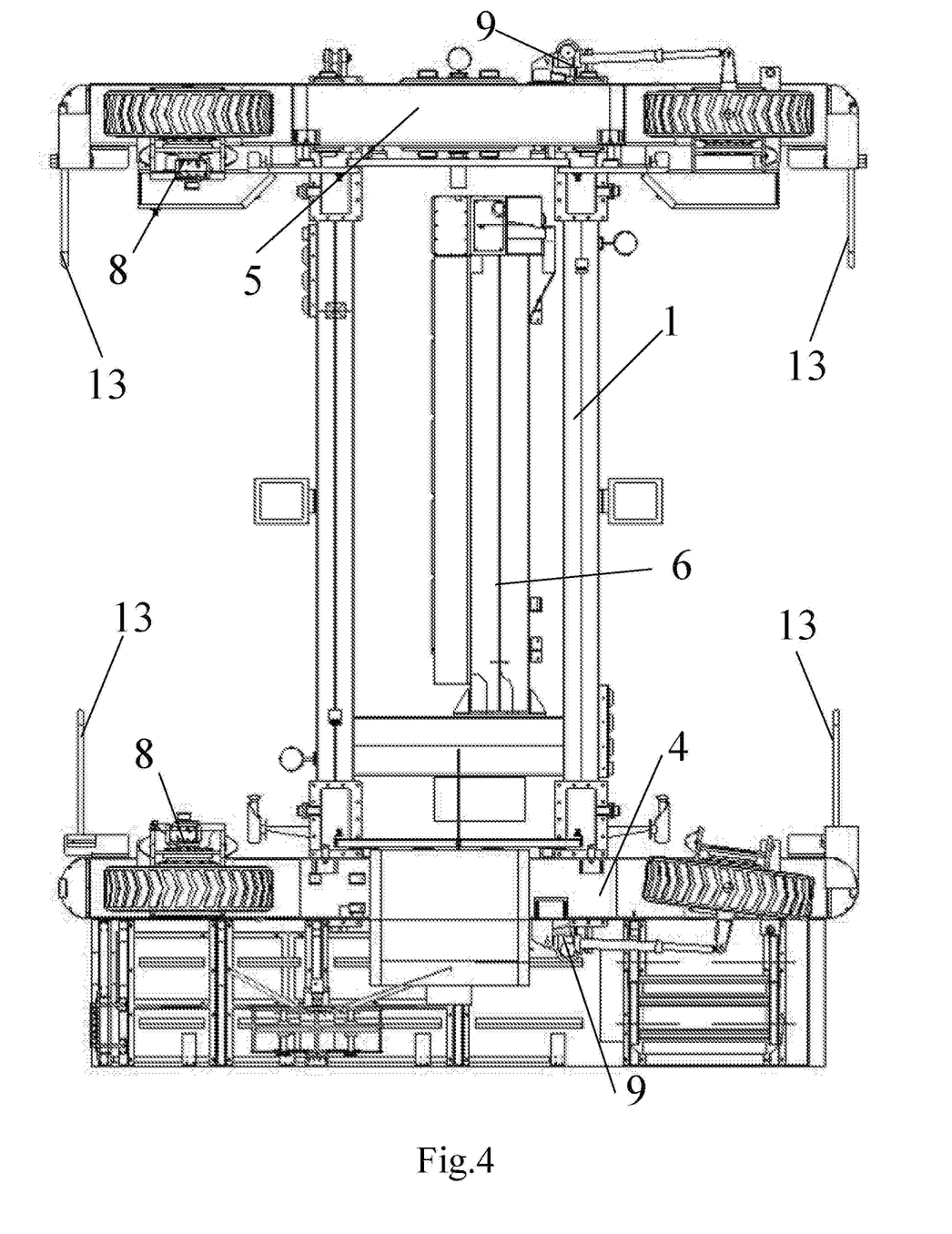
FIG. 4 is a bottom schematic structural view of the self-propelled container and/or vehicle inspection device as shown in FIG. 2.

As shown in FIG. 1 and FIG. 4, in any of the above technical solutions, preferably, the self-propelled container and/or vehicle inspection device further includes two steering motors 9 connected to the first wheel and the third wheel respectively or connected to the second wheel and the fourth wheel respectively, wherein the steering motors 9 are used to push the wheels to rotate in the horizontal direction relative to the gantry, and each of the two steering motors 9 is connected to the power supply apparatus and the controller respectively.

In this embodiment, the two steering motors 9 can push two front wheels or the two rear wheels of the inspection device to rotate horizontally to control a travelling direction of the inspection device or to steer the inspection device, thereby making the inspection device more flexible and applicable for different vehicles or containers, or manipulating the self-propelled container and/or vehicle inspection device to replace work site.

As shown in FIG. 1 to FIG. 3, in any of the above technical solutions, preferably, the self-propelled container and/or vehicle inspection device further includes a radiation shielding component. The radiation shielding component is mounted on the gantry for blocking unwanted rays. Wherein, the radiation shielding component includes a first shielding body 10, a second shielding body 11, a vertical ray trap, a horizontal ray trap, a first protective layer and a second protective layer. The first shielding body 10 is mounted at the second vertical beam 3 and located at a side of the vertical detector cabin 7 facing away from away from the radiation source. The second shielding body 11 is mounted at the first vertical beam 2 and located between the radiation source and the vertical detector cabin 7, wherein the second shielding body 11 is provided with a slit extending in a up and down direction, and the slit is aligned with the ray outlet of the radiation source. The vertical ray trap is mounted at the second vertical beam, which is located at the side of the vertical detector cabin facing away from the radiation source and exactly facing the vertical detector cabin. The horizontal ray trap is mounted at the transverse beam 1, which is located above the horizontal detector cabin 6 and exactly facing the horizontal detector cabin 6. The first protective layer is arranged at a front cabin wall and a rear cabin wall of the vertical detector cabin 7. The second protective layer is arranged at a front cabin wall and a rear cabin wall of the horizontal detector cabin 6.

In these solutions, the radiation shielding component is provided at the self-propelled container and/or vehicle inspection device, without occupying the space of scanning inspection site, which could meet needs of small site operation for the inspection device. And, the radiation shielding component is provided at the self-propelled container and/or vehicle inspection device, which could move with the self-propelled container and/or vehicle inspection device. Therefore, it is unnecessary to rebuild a radiation shielding wall or other radiation shielding facilities in case that work site of the inspection device is replaced, which reduces use cost of the inspection device, thereby improving market competitiveness of product. Wherein, the first shielding body and the second shielding body are generally selected form steel plates or lead plates, and materials of the horizontal ray trap, the vertical ray trap, the first protective layer and the second protective layer are preferably plumbum.

As shown in FIG. 1 to FIG. 4, in any of the above technical solutions, preferably, the rack is provided with a passage through which the container or vehicle to be inspected passes, and the self-propelled container and/or vehicle inspection device further includes an anti-collision device. Wherein, the anti-collision device includes a passage detecting component, an obstacle detecting component and four protective door components. The passage detecting component is mounted in the passage and connected to the power supply apparatus and the controller for inspecting whether the containers and/or the vehicles to be inspected are biased to the passage, and transmitting a detector signal to the controller. The obstacle detecting component is mounted at an edge of the rack and connected to the power supply apparatus and the controller for detecting whether an obstacle exists in a preset range in a traveling direction of the self-propelled container and/or vehicle inspection device, and transmitting the detector signal to the controller. Four protective door components are respectively mounted at a front end of the left and right sides of the rack and a rear end of the left and right sides and located in the passage, wherein each of the protective door components includes a trigger door 13 hinged to the rack and a detector cooperating with the trigger door 13, the detector is used for transmitting a detector signal to the controller when the inspected containers and/or the inspected vehicles hit the trigger door 13.

The present solutions realize active collision avoidance function by the passage detecting component and the obstacle detecting component, and realize passive collision avoidance function by the protective door components. Detecting components are provided to detect whether an object to be inspected is aligned with the passage so as to avoid the object to be inspected colliding with the inspection device. The obstacle detecting component is used to detect whether there is the obstacle on the route of the inspection device, and to avoid the inspection device colliding with the obstacle. The protective door components are mounted in the passage. During detecting, if there is a problem with relative movement direction of the inspection device and containers and/or vehicles, before the containers and/or the vehicles collide with the inspection device, the containers and/or the vehicles will first hit the trigger doors, causing the trigger doors to rotate. When the trigger doors are turned to or exceed a preset angle and/or a preset position, the detectors send a trigger signal to the controller, and when the controller receives the trigger signal, a corresponding program is triggered. For example, controlling stop, advance, sending out alarm of the inspection device, the inspection device and the inspected object are prevented from colliding, and the inspection device and the inspected object are prevented from being damaged. Wherein, the detecting device can select a travel switch.

As shown in FIG. 1, In any of the above technical solutions, preferably, the self-propelled container and/or vehicle inspection device further includes a plurality of signal acquisition cameras, which are respectively mounted at the rack, and each of the signal acquisition cameras is respectively connected to the power supply device and the controller for collecting a box number of the inspected containers and/or a plate number of the inspected vehicles.

In any of the above technical solutions, preferably, the self-propelled container and/or vehicle inspection device further includes a plurality of monitors 12, which are respectively mounted at front, rear, left and right sides of the rack, and each of the monitors 12 is respectively connected to the power supply apparatus and the controller, and used for monitoring situation around the self-propelled container and/or vehicle inspection device.

In any of the above technical solutions, preferably, the self-propelled container and/or vehicle inspection device further comprises a data transmission device, used for connecting to a remote console and performing data transmission with the remote console; wherein, the data transmission apparatus comprises a transmission fiber and/or a wireless transmission device.

In these solutions, the data transmission is performed by the data transmission device and the remote console to transmit inspection scanning patterns of the containers and/or the vehicles and data collected by the signal acquisition cameras and the monitors 12 to the remote console for review by the staffs. And the remote console may send a control signal to the self-propelled container and/or vehicle inspection device by the data transmission device to control working state of the inspection device, thereby implementing remote control.

In any of the above technical solutions, preferably, the self-propelled container and/or vehicle inspection device further includes a housing control box and/or a wireless control device. The housing control box is mounted at the rack and connected to the controller for sending control commands to the controller and/or controlling start and stop of the power supply apparatus. The wireless control device is capable of wirelessly transmitting with the controller, and used for sending control commands to the controller and/or controlling start and stop of the power supply apparatus.

When the self-propelled container and/or vehicle inspection device works, in order to ensure safety, it is usually necessary for the staffs to monitor on site. When the inspection device is in danger of colliding or other unexpected conditions, the staffs on site can control the inspection device by the housing control box and/or the wireless control device to cope with unexpected situations. Wherein, the distance between the staffs on site and the inspection device is pulled apart by a control device of the wireless control device, which can reduce the risk of on-site work.

In any of the above technical solutions, preferably, the self-propelled container and/or vehicle inspection device further comprises a temperature control device. The temperature control device includes a detector cabin air conditioning system and a radiation source air conditioning system. The detector cabin air conditioning system is connected to the controller and the power supply apparatus, and communicated to the vertical detector cabin 7 and the horizontal detector cabin 6 for controlling a temperature in the vertical detector cabin 7 and the horizontal detector cabin 6. The first vertical beam 2 is provided with a mounting cabin for mounting the ray source, and the radiation source air conditioning system is connected to the controller and the power supply apparatus, and communicated to the mounting cabin for controlling the temperature of the mounting cabin.

The radiation source air conditioning system is used for controlling temperature of the mounted cabin of the radiation source within a preset range, the detector cabin air conditioning system is used for controlling the temperature of two detector cabins within the preset range, so that the self-propelled container and/or vehicle inspection device can operate in hot and cold natural environment.

In any of the above technical solutions, preferably, the self-propelled container and/or vehicle inspection device further comprises an automatic navigation device, which is connected to the power supply apparatus and the controller, and used for setting a preset travelling route of the self-propelled container and/or vehicle inspection device and detecting whether the self-propelled container and/or vehicle inspection device deviates from the preset travelling route. At the same time the automatic navigation device sends the detector signal to the controller, so that the controller controls the traveling direction of the self-propelled container and/or vehicle inspection device according to the detector signal.

The automatic navigation device usually includes a device positioning device and a detecting device for detecting object positions, wherein the device positioning device is used for determining position coordinates of the inspection device, and the detecting device for detecting object positions is used for detecting positions of the inspected containers and/or inspected vehicles. Specifically, the device positioning device may adopt a GPS, and the detecting device for detecting object positions may adopt a photoelectric ranging sensor. GPS detects current position coordinates of the inspected device and transmits coordinates information of the inspected equipment to the controller. The photoelectric ranging sensor measures distance between the inspected object and the inspection device and transmits distance information to the controller, so that the controller calculates the position coordinates of the inspected object according to the coordinate information of the inspection device and above distance information. And the controller sets the preset travelling route according to the coordinate information of the inspected object and the distance of the inspection device, subsequently, the inspected device is controlled to advance along the preset travelling route. During traveling, GPS detects the position coordinates of the inspection device in real time and sends it to the controller. When the controller finds that the position coordinates of the inspection device deviates from the preset travel rout, traveling route of the inspection device may be corrected by adjusting difference in speed between left and right driving motors of by controlling steering motors to drive the inspected device to turn. Based on this, the automatic navigation device can also cooperate with the obstacle detecting component. When the obstacle detecting component finds an obstacle on the traveling route of the device, the detecting device for detecting object positions and the controller obtain the position coordinates of the obstacle according to above-described detecting principle. The controller resets the preset travelling route according to coordinates of the inspection device, the obstacle, and the inspected containers and/or the vehicles, so that the inspection device can automatically bypass the obstacle during travelling.

In any of the above technical solutions, preferably, the self-propelled container and/or vehicle inspection device further includes a vehicle position detecting device, which is connected to the power supply apparatus, and used for detecting a position of the inspected vehicle.

The inspection device is provided with a quick check mode when inspecting the vehicles. During quick check, the inspection device is stationary, and each of the inspected vehicles passes through the passage of the inspection device in turn. In order to prevent the ray beam from being irradiated to driver of the vehicles, the inspection device mounts the vehicle position detecting device in the passage. The inspected vehicles are all trunks, and there is a gap between head and box of trunks. The vehicle position detecting device usually uses a photoelectric sensor, and sensor position is in a vertical plane where the ray beam is located. When detecting light of sensor is irradiated into above gap, it is proved that the head of trunks has passed a ray exit position, and the sensor sends a signal to the controller, so that the controller controls the radiation source to emit rays and starts scanning. When the box of trunks passes completely the ray exit position, the detected light of the sensor is no longer blocked by the box of trunks. At this time, the sensor sends a signal to the controller, so that the controller controls the radiation source to stop emitting rays and stops the scanning work.

In any of the above technical solutions, preferably, the self-propelled container and/or vehicle inspection device further includes a radioactive substance detecting device, which is connected to the power supply apparatus and the controller, and used for detecting whether a radioactive substance exists in the container and/or the inspected vehicle to be inspected.

In any of the above technical solutions, preferably, the self-propelled container and/or vehicle inspection device further includes an infrared thermal scanning device, which is connected to the power supply apparatus and the controller, and used for performing thermal scanning to the container and/or the vehicle to be inspected.

In any of the above technical solutions, preferably, the self-propelled container and/or vehicle inspection device further includes a biochemical dangerous article detecting device, which is connected to the power supply device and the controller, and used for detecting whether there is biochemical dangerous articles in the inspected container and/or the inspected vehicle.

If there are biological dangerous articles (biotoxic gas, etc.) and chemical dangerous articles (flammable and explosive substances, chemical poison gas, etc.) in the inspected object, these dangerous articles will volatilize a certain amount of gas. The biochemical dangerous article detecting device comprises gas collecting device arranged in the passage. When the inspected object passes the passage, the gas collecting device performs gas production, and the biochemical dangerous article detecting device performs inspection and analysis on gas samples to determine whether the biochemical dangerous articles are contained in the containers and/or the vehicles.

In any of the above technical solutions, preferably, the self-propelled container and/or vehicle inspection device further comprises a multi-information integration device, which is connected to the power supply device and the controller, and used for integrating detection images of each of detector devices with radiation scanning images.

In these solutions, the multi-information integration device integrates the radiation scanning images, infrared thermal scanning images, radioactive material inspection information, and biochemical dangerous article detecting into one image for review by the staffs.

In the description of the present disclosure, it is to be understood that the orientation or position relations indicated by the terms "top", "bottom", "upper", "lower", "front", "back", "left", "right", "inside", are based on the orientation or positional relationship shown in the accompanying drawings, and are merely for the convenience of describing the present disclosure and the simplified description, and do not indicate or imply that device or component referred to has a specific orientation, and is constructed and operated in a specific orientation. Therefore, it cannot be understood as limitation of the present disclosure. The terms "connected", "mounted", "fixed", etc. should be understood broadly. For example, "connected" may be a fixed connection, a detachable connection, or an integral connection; it may be directly connected or indirectly connected by intermediate media. For those skilled in the art, the specific meanings of the above terms in the present disclosure can be understood according to the specific circumstances.

In the description of the present specification, the terms "first", "second", "third", "fourth" are used for the purpose of description only, and are not to be construed as indicating or implying relative importance unless otherwise specified and limited; the descriptions of the terms "one embodiment", "some embodiments", "specific embodiment", etc., are intended to mean that a particular feature, structure, material or feature described in connection with the at least one of embodiments or examples of the present disclosure. In the present specification, the schematic representation of the above terms does not necessarily refer to the same embodiment or example.

The above description is only a preferred embodiment of the present disclosure and is not intended to limit the present disclosure. For those skilled in the art, the present disclosure may have various modifications and changes. Any modification, equivalent replacement, improvement, etc. made within the spirit and principles of the present disclosure shall be included within the scope of protection of the present disclosure.

What is claimed is:

1. A self-propelled container and/or vehicle inspection device comprising:
    a rack comprising a gantry, a fixed beam and a swing beam, wherein the gantry comprises a transverse beam and a first vertical beam and a second vertical beam arranged at left and right ends of the transverse beam, the fixed beam is arranged in a front-rear direction and is fixedly connected to the first vertical beam, and a first wheel and a second wheel are respectively mounted at front and rear ends of the fixed beam, the swing beam is arranged in the front-rear direction and is rotatably connected to the second vertical beam, such that the swing beam could rotate in a vertical direction relative to the second vertical beam, and a third wheel and a fourth wheel are respectively mounted at front and rear ends of the swing beam;
    a power supply apparatus mounted on the rack;
    a radiation source mounted on the first vertical beam and connected to the power supply apparatus and configured to generate a ray beam;
    a detector cabin comprising a horizontal detector cabin mounted on the transverse beam and a vertical detector cabin mounted on the second vertical beam, wherein a detector array mounted is in the horizontal detector cabin and the vertical detector cabin, each of detectors is respectively connected to the power supply apparatus, each of the detectors is respectively aligned with a center of the ray beam;
    at least two driving motors respectively connected to the power supply apparatus, wherein each of the driving motors is connected to one wheel, and wheels connected to each of the driving motors are different, the driving motors are configured to drive the wheels around and axes to rotate; and
    a controller connected to the power supply apparatus, the radiation source, each of the detectors and each of the driving motors.

2. The self-propelled container and/or vehicle inspection device according to claim 1, wherein,
    the first vertical beam is detachably hinged to the transverse beam by a first hinge shaft;
    the second vertical beam is detachably hinged to the transverse beam by a second hinge shaft.

3. The self-propelled container and/or vehicle inspection device according to claim 2, wherein,
    the first wheel and the second wheel are respectively rotatable, relative to the first vertical beam in a horizontal direction till the axes thereof extending in the front-rear direction;
    the third wheel and the fourth wheel are respectively rotatable, relative to the second vertical beam in the horizontal direction till the axes thereof extending in the front-rear direction.

4. The self-propelled container and/or vehicle inspection device according to claim 2, wherein,
    a first centering protrusion is provided at a front surface and a rear surface of the transverse beam at the left end thereof, and a second centering protrusion is provided at the first vertical beam, and when the second vertical beam rotates relative to the transverse beam till to an assembly position, the first centering protrusion against the second centering protrusion to form a limit in the front-rear direction;
    a third centering protrusion is provided at the front surface and the rear surface of the transverse beam at the right end thereof, and a fourth centering protrusion is provided at the first vertical beam, and when the second vertical beam rotates relative to the transverse beam till to the assembly position, the third centering protrusion against the fourth centering protrusion to form the limit in the front-rear direction.

5. The self-propelled container and/or vehicle inspection device according to claim 1, wherein,
    the horizontal detector cabin and the vertical detector cabin are detachably connected to the transverse beam and the second vertical beam respectively, and the vertical detector cabin is rotatably connected to the horizontal detector cabin.

6. The self-propelled container and/or vehicle inspection device according to claim 1, wherein, the radiation source comprises:
    a shielding case comprising a case body and a collimator, wherein the case body is mounted on the first vertical beam, the case body is provided with a mounting cavity and a ray outlet in communication with the mounting cavity, the collimator is fixedly mounted on the case body, wherein the case body comprises a slit aligned with the ray outlet; and a radiation source body mounted in the mounting cavity, wherein the mounting cavity comprises an outlet aligned with the ray outlet.

7. The self-propelled container and/or vehicle inspection device according to claim 1, wherein,
the power supply apparatus comprises a cable reel and/or a fuel generator.

8. The self-propelled container and/or vehicle inspection device according to claim 1, wherein, further comprising:
two steering motors connected to the first wheel and the third wheel respectively or connected to the second wheel and the fourth wheel respectively, wherein the steering motors are configured to push the wheels to rotate in the horizontal direction relative to the gantry, and each of the two steering motors is connected to the power supply apparatus and the controller respectively.

9. The self-propelled container and/or vehicle inspection device according to claim 1, wherein, further comprising:
a radiation shielding component mounted on the gantry for blocking unwanted rays; wherein, the radiation shielding component comprises:
a first shielding body, mounted at the second vertical beam and located on a side of the vertical detector cabin facing away from away from the radiation source;
a second shielding body, mounted at the first vertical beam and located between the radiation source and the vertical detector cabin, wherein the second shielding body is provided with a slit extending in a up and down direction, and the slit is aligned with the ray outlet of the radiation source;
a vertical ray trap mounted at the second vertical beam, which is located at the side of the vertical detector cabin facing away from the radiation source and exactly facing the vertical detector cabin;
a horizontal ray trap mounted at the transverse beam, which is located above the horizontal detector cabin and exactly facing the horizontal detector cabin;
a first protective layer arranged at a front cabin wall and a rear cabin wall of the vertical detector cabin; and
a second protective layer, arranged at a front cabin wall and a rear cabin wall of the horizontal detector cabin.

10. The self-propelled container and/or vehicle inspection device according to claim 1, wherein,
the rack is provided with a passage through which a container or vehicle to be inspected passes, and the self-propelled container and/or vehicle inspection device further comprises an anti-collision device;
wherein, the anti-collision device comprises:
a passage detecting component mounted in the passage and connected to the power supply apparatus and the controller for inspecting whether the container and/or the vehicle to be inspected is biased to the passage, and transmitting a detector signal to the controller;
an obstacle detecting component mounted at an edge of the rack and connected to the power supply apparatus and the controller for detecting whether an obstacle exists in a preset range in a traveling direction of the self-propelled container and/or vehicle inspection device, and transmitting the detector signal to the controller; and
four protective door components respectively mounted at a front end of the left and right sides of the rack and a rear end of the left and right sides and located in the passage, wherein each of the protective door components comprises a trigger door hinged to the rack and the detectors cooperating with the trigger doors, the detector is configured to transmit the detector signal to the controller when the inspected containers and/or the inspected vehicles hit the trigger door.

11. The self-propelled container and/or vehicle inspection device according to claim 1, wherein, further comprising:
a plurality of signal acquisition cameras respectively mounted at the rack, and each of the signal acquisition cameras is respectively connected to the power supply device and the controller for collecting a box number of the inspected containers and/or a plate number of the inspected vehicles.

12. The self-propelled container and/or vehicle inspection device according to claim 1, wherein, further comprising:
a plurality of monitors, respectively mounted at front, rear, left and right sides of the rack, and each of the monitors is respectively connected to the power supply apparatus and the controller, and used for monitoring situation around the self-propelled container and/or vehicle inspection device.

13. The self-propelled container and/or vehicle inspection device according to claim 1, wherein, further comprising:
a data transmission device configured to connect to a remote console and performing data transmission with the remote console;
wherein, the data transmission apparatus comprises a transmission fiber and/or a wireless transmission device.

14. The self-propelled container and/or vehicle inspection device according to claim 1, wherein, further comprising:
a housing control box mounted at the rack and connected to the controller for sending control commands to the controller and/or controlling start and stop of the power supply apparatus; and/or
a wireless control device capable of wirelessly transmitting with the controller for a sending control command to the controller and/or controlling start and stop of the power supply apparatus.

15. The self-propelled container and/or vehicle inspection device according to claim 1, wherein, further comprising:
a temperature control device comprising:
a detector cabin air conditioning system connected to the controller and the power supply apparatus, and communicated to the vertical detector cabin and the horizontal detector cabin for controlling a temperature in the vertical detector cabin and the horizontal detector cabin; and
a radiation source air conditioning system, wherein the first vertical beam is provided with a mounting cabin used for mounting the ray source, and the radiation source air conditioning system is connected to the controller and the power supply apparatus, and communicated to the mounting cabin for controlling the temperature of the mounting cabin.

16. The self-propelled container and/or vehicle inspection device according to claim 1, wherein, further comprising:
an automatic navigation device connected to the power supply apparatus and the controller, for setting a preset travelling route of the self-propelled container and/or vehicle inspection device and detecting whether the self-propelled container and/or vehicle inspection device deviates from the preset travelling route, simultaneously sending the detector signal to the controller, so that the controller controls the traveling direction of the self-propelled container and/or vehicle inspection device according to the detector signal.

17. The self-propelled container and/or vehicle inspection device according to claim 1, wherein, further comprising:
   a vehicle position detecting device connected to the power supply apparatus for detecting a position of the inspected vehicles.

18. The self-propelled container and/or vehicle inspection device according to claim 1, wherein, further comprising:
   a radioactive substance detecting device connected to the power supply apparatus and the controller for detecting whether a radioactive substance exists in a container and/or a vehicle to be inspected.

19. The self-propelled container and/or vehicle inspection device according to claim 1, wherein, further comprising:
   an infrared thermal scanning device connected to the power supply apparatus and the controller for performing thermal scanning to a container and/or a inspected vehicle to be inspected.

20. The self-propelled container and/or vehicle inspection device according to claim 1, wherein, further comprising:
   a biochemical dangerous article detecting device connected to the power supply device and the controller for detecting whether there are biochemical dangerous articles in a container and/or a vehicle to be inspected; and/or
   a multi-information integration device connected to the power supply device and the controller for integrating detection images with radiation scanning images of each of detector devices.

* * * * *